(12) United States Patent
Alacqua et al.

(10) Patent No.: US 6,762,669 B2
(45) Date of Patent: Jul. 13, 2004

(54) SHAPE MEMORY ACTUATOR WITH BI-STABLE OPERATION

(75) Inventors: Stefano Alacqua, Orbassano (IT); Francesco Butera, Orbassano (IT); Bartolomeo Pairetti, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/098,299

(22) Filed: Mar. 18, 2002

(65) Prior Publication Data

US 2002/0130754 A1 Sep. 19, 2002

(30) Foreign Application Priority Data

Mar. 16, 2001 (IT) ...................................... TO2001A0248

(51) Int. Cl.[7] .......................... H01H 61/06; H01H 61/02
(52) U.S. Cl. ........................ 337/140; 337/123; 60/528
(58) Field of Search .......................... 337/12, 14, 140, 337/339, 141, 343, 298, 393; 148/402, 563; 60/527, 528

(56) References Cited

U.S. PATENT DOCUMENTS

| 3,634,803 A | * | 1/1972 | Willson et al. ............. 337/123 |
| 3,748,197 A | * | 7/1973 | Willson et al. ............. 148/563 |
| 3,872,415 A | * | 3/1975 | Clarke ........................ 337/140 |
| 3,968,380 A | * | 7/1976 | Jost et al. ..................... 307/99 |
| 4,544,988 A | * | 10/1985 | Hochstein ................... 361/211 |
| 4,551,975 A | * | 11/1985 | Yamamoto et al. ........... 60/528 |
| 4,700,541 A | * | 10/1987 | Gabriel et al. ................ 60/528 |
| 4,806,815 A | * | 2/1989 | Honma ....................... 310/307 |
| 4,887,430 A | * | 12/1989 | Kroll et al. ................... 60/527 |
| 5,410,290 A | * | 4/1995 | Cho ........................... 337/140 |
| 5,455,549 A | * | 10/1995 | Strickland et al. ............ 335/17 |
| 5,825,275 A | * | 10/1998 | Wuttig et al. ............... 337/139 |
| 5,990,777 A | * | 11/1999 | Whiteman, Jr. ............. 337/140 |
| 6,133,816 A | * | 10/2000 | Barnes et al. ............... 337/123 |
| 6,239,686 B1 | * | 5/2001 | Eder et al. .................... 337/382 |
| 6,404,098 B1 | * | 6/2002 | Kayama et al. ............. 310/307 |

FOREIGN PATENT DOCUMENTS

DE 3731146 A1 * 3/1989 ............. F03G/7/06

* cited by examiner

*Primary Examiner*—Anatoly Vortman
(74) *Attorney, Agent, or Firm*—Sughrue Mion, PLLC

(57) ABSTRACT

A shape memory actuator includes a shape memory actuator element for biasing an actuated member from an initial rest position to an operative position against the action of return spring means. Holding means are associated with the actuator element for holding the actuated member in its operative position even when the shape memory actuator element is deactivated. These holding means can be deactivated with a subsequent activation of the shape memory actuator element, allowing the actuated member to return to its rest position.

4 Claims, 1 Drawing Sheet

FIG. 1
FIG. 2
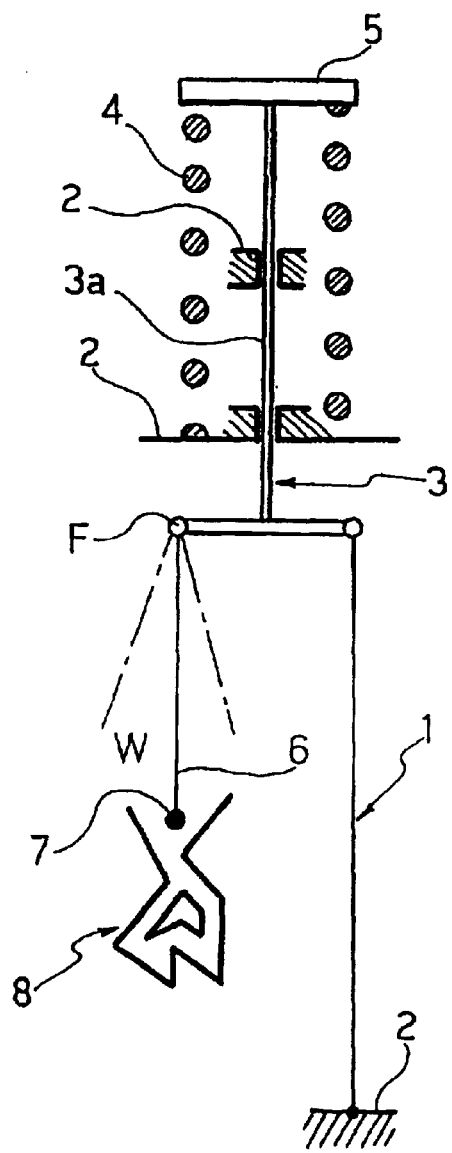
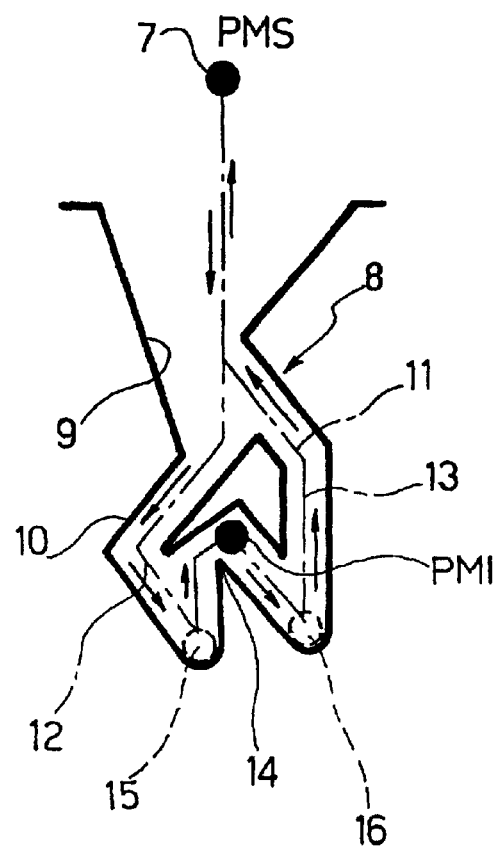

SHAPE MEMORY ACTUATOR WITH BI-STABLE OPERATION

BACKGROUND OF THE INVENTION

The present invention concerns shape memory actuators of the type including:

a shape memory actuator element connecting a support structure to an actuated member, for the purposes of moving the latter from a first position to a second position when the shape memory actuator element is heated above a predetermined temperature, and return spring means biassing the actuated member towards its first position.

Shape memory actuators have already found a variety of applications in different technological fields. These actuators make use of actuator elements composed of a shape memory material, typically a nickel and titanium alloy, which possesses the property of contracting when its temperature exceeds a certain transition value. The Applicant has already presented various patent applications regarding shape memory actuator applications, such as for the adjustment of motor vehicle rear-view mirrors, deflector plates in air conditioners for motor vehicles, and various other devices. The advantage of these actuators resides in the fact that they have an extremely simply structure, are light and occupy little space, whilst simultaneously providing reliable and efficient operation.

A possible drawback that limits the application of these actuators resides in the fact that they exhibit an intrinsically monostable mode of operation. In other words, they can be switched between a rest condition and an active condition by heating the element made of a shape memory material, this heating being achieved by passing an electrical current through the actuator element for example. When the actuator element cools down, when current is no longer present for example, it automatically returns to its rest condition. This return motion is often aided by providing return spring means, as already defined above. Consequently, with these actuators, if it is wished to keep the actuated member in the position corresponding to the actuator's active position, the actuator must be kept hot, i.e. by continuing to pass an electrical current through it, for example. Alternatively, it is possible to provide a mechanical fastening system for maintaining the actuator in position even after it has cooled down, but in this case, it is also necessary to provide an additional actuator device for releasing the fastener mechanism. Another known solution is that of providing two opposing actuators that are selectively activated to maintain the actuated member in a first or second position, even when the other actuator is "cold". All of the above solutions are complicated, bulky and expensive.

SUMMARY OF THE INVENTION

The object of this invention it that of realizing a shape memory actuator that exhibits bi-stable operation, in other words one that is capable of remaining stable in both the rest position and the active position when the actuator element is "cold", and that provides a single shape memory element for this purpose, thereby advantaging compactness, costs and constructional simplicity.

In order to achieve this objective, the subject of the invention is a shape memory actuator possessing the characteristics indicated at the beginning of this description and which is also characterized in that suitable holding means are associated with the said actuator element for holding the actuated member in its second position even when the shape memory actuator element cools down, said holding means being deactivated to allow the controlled organ to return to its first position following a further activation of the shape memory actuator.

In a practical form of embodiment of the invention, the said holding means include a cam guide mounted on the support structure and a cursor that can move along the guide and is operatively connected to the actuated member, said cam guide having a first dead point corresponding to the first position of the actuated member and a second dead point, corresponding to the second position of the actuated member, in which the said cursor is restrained due to the return effect of the said spring means.

When the actuated member is in the first position, heating of the actuator element causes the actuated member to move to its second position. Simultaneously, the said cursor moves along the cam guide until it reaches the said second dead point, where it is blocked by the cam guide, even when the shape memory actuator is cooled down. To bring the actuated member back to its first position, it is necessary to activate the actuator element a second time, in order to make the cursor leave the second dead point and then allow it to return to the start position under the effect of the return spring means and with the actuator element cooled down. In other words, each successive heating of the actuator element provokes either the passage of the actuated member from its first position to its second position, or the passage of the actuated member from its second position to its first position, this actuated member always being restrained in the position that it reaches each time after the actuator element cools down.

BRIEF DESCRIPTION OF THE DRAWINGS

Further characteristics and advantages of the invention will become clear from the description that follows, supplied merely as a non limitative example and with reference to the enclosed drawings, where:

FIG. 1 is a schematic view of a form of embodiment of an actuator device in accordance with the invention, and FIG. 2 is an enlarged-scale view of a detail in FIG. 1.

DETAILED DESCRIPTION OF THE INVENTION

In FIG. 1, reference number 1 schematically indicates a shape memory actuator composed of a wire made of a shape-memory alloy, with one end connected to a fixed support structure 2, and the other end connected to an actuated member 3. The actuated member 3 is schematically illustrated in the drawings and can naturally be represented by any type of member destined to be moved between two different operational positions. In the illustrated example, the actuated member 3 includes a rod 3a guided in a smooth-running manner with respect to the fixed structure 2 and drawn towards a first position by a coil spring 4 that is inserted between the between the fixed structure 2 and a small plate 5 connected to the rod 3a.

When the shape-memory element 1 is heated, by passing an electrical current for example, the wire 1 contracts and, starting from the position illustrated in FIG. 1, moves the actuated member 3 downwards, compressing the return spring 4.

In traditional shape memory actuators, the structure is substantially that described above. These actuators thus exhibit a monostable operation, in the sense that when the wire 1 is no longer heated it returns to its natural condition, for which the actuated member 3 returns to its start position, this being also aided by the return action of the spring 4.

The shape memory actuator in accordance with the invention instead exhibits bi-stable operation. In order to achieve this, the actuated member 3 carries a small rod 6, oscillating at point F with respect to the member 3. The small rod 6 terminates with a ferrule or cursor 7 that engages with a substantially closed-loop cam guide 8.

As can be seen in FIG. 2, the cam guide has a substantially inverted-Y shape, with an entrance section 9, two diverging sections 10 and 11, and another two sections 12 and 13 joined by a central V-shaped section 14.

When the actuated member 3 is in its rest position illustrated in FIG. 1, the cursor 7 is in an upper dead point indicated as PMS in FIG. 2. Starting from this condition, following activation of the shape memory element 1, the actuated member 3 is lowered, During the lowering of the actuated member 3, the cursor 7 enters the entrance section 9 of the cam guide 8 and then runs through sections 10 and 12 until it arrives at a maximum point indicated by reference number 15. At this point, should the shape memory wire 1 be cooled, the cursor 7 will return upwards under the effect of the return action of the spring 4, until it engages the apex of the V-shaped section 14 where it becomes trapped, consequently blocking the actuated member 3 in its second position, in spite of the return action of the spring 4 and the fact that the action of the actuator element 1 has ceased. To return the actuated member 3 to its first rest position, it is necessary to activate the actuator element 1 again, to lower the actuated member 3 by a sufficient distance to bring the cursor 7 to the point indicated by reference number 16 in FIG. 2. At this point, deactivating the actuator element 1, will cause the actuated member 3 to return to its first rest position, because the cursor 7 is free to move through the sections 13 and 11 of the cam guide 8 until the upper dead point PMF is reached.

Naturally, where it is wished to provide more than one stable position, it would be possible to arrange various V-shaped sections, of the same type as section 14, in series in the cam guide 8.

Furthermore, whilst maintaining the principle upon which the invention is based, which consists in associating the actuator element with holding means having a bi-stable operation of a type similar to that described above, the shape of the cam guide 8 could naturally be different, as well as the shape of the actuator element 1 and the actuated member 3.

The above-described solution allows bi-stable operation of an actuated member via a shape memory actuator to be achieved without resorting to complicated solutions, such as the utilization of more than one shape memory actuator for example.

What is claimed is:

1. A bistable shape memory actuator device, comprising:
   a single shape memory actuator element connecting a support structure to an actuated member, for the purpose of moving the latter from a first position to a second position when the single shape memory actuator element is heated above a predetermined temperature, and
   return spring means for biassing the actuated member towards its first position,
   wherein holding means, suitable for holding the actuated member in its second position even when the single shape memory actuator element cools down, are associated with said single shape memory actuator element, said holding means being deactivated to allow the actuated member to return to its first position following a subsequent activation of the single shape memory actuator element, and
   wherein said return spring means include a cursor associated with the shape memory actuator element and a cam guide within which said cursor is engaged, and in which a first dead point and a second dead point are defined, where the cursor remains when the actuated member is in its first position or its second position, with the actuator element deactivated.

2. An actuator according to claim 1, wherein said cam guide possesses an entrance section, followed by a diverging section and a converging section terminating in an inverted-V shaped section, the other end of which is connected to the entrance section via two additional sections, which together define a closed-loop path.

3. An actuator according to claim 2, wherein said cursor is mounted on the end of a rod connected in an oscillating manner to the actuated member.

4. An actuator according to claim 1, wherein said return spring means also function as return spring means for the holding means.

* * * * *